Figure 1:
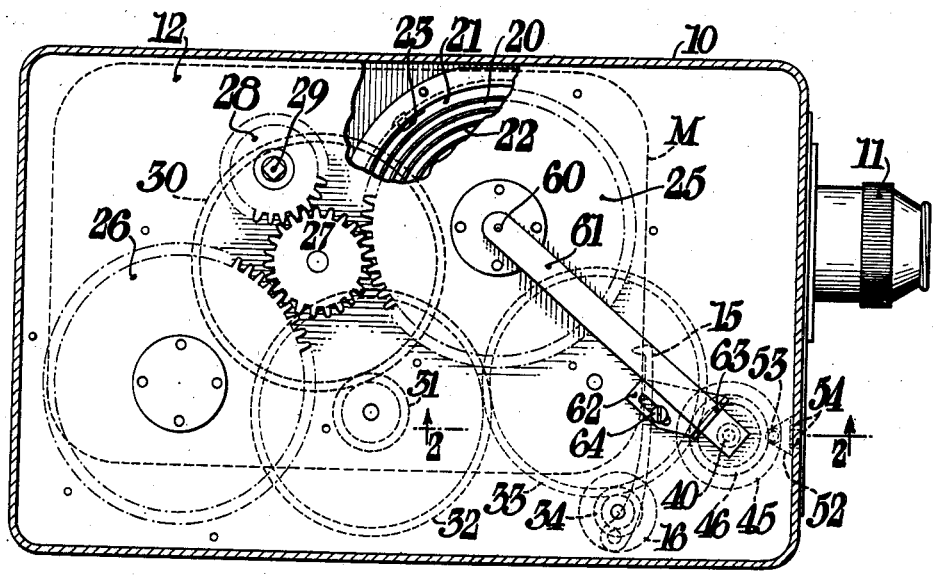

Nov. 14, 1939.　　　G. GUNNARSON　　　2,180,005
SPEED CONTROL FOR SPRING MOTOR DRIVEN APPARATUS
Filed Sept. 25, 1936

Gunnar Gunnarson,
INVENTOR

Nov. 14, 1939.   G. GUNNARSON   2,180,005
SPEED CONTROL FOR SPRING MOTOR DRIVEN APPARATUS
Filed Sept. 25, 1936   2 Sheets-Sheet 2
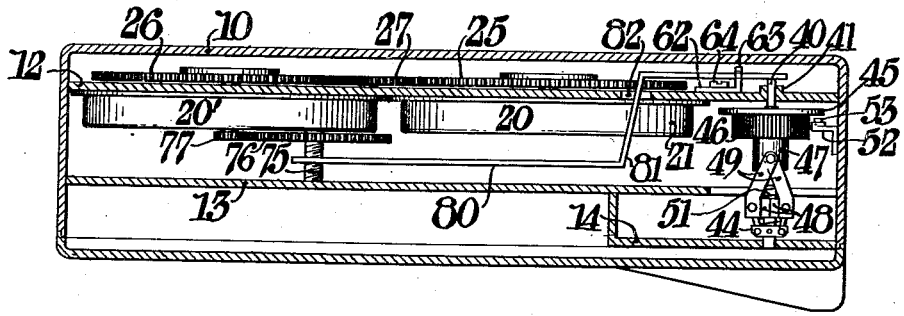
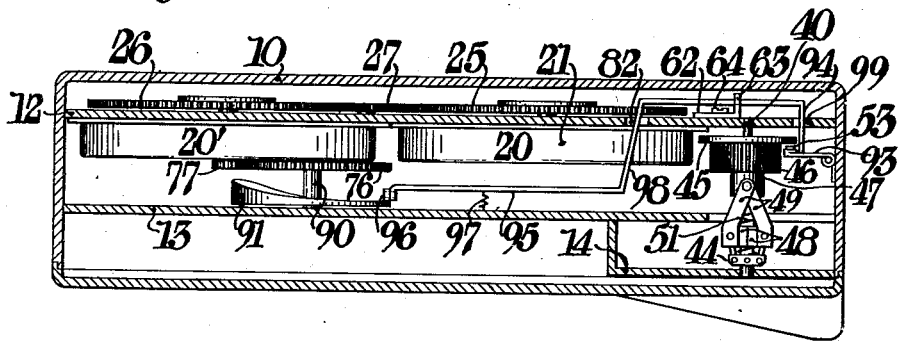
Gunnar Gunnarson,
INVENTOR.
BY
ATTORNEYS.

Patented Nov. 14, 1939

2,180,005

UNITED STATES PATENT OFFICE 2,180,005

SPEED CONTROL FOR SPRING MOTOR DRIVEN APPARATUS

Gunnar Gunnarson, Rochester, N. Y., assignor to Eastman Kodak Company, Rochester, N. Y., a corporation of New Jersey Application September 25, 1936, Serial No. 102,568

19 Claims. (Cl. 185—37)

This invention relates to controlling means for centrifugal governors, and particularly to a controlling means for such governors used in conjunction with spring motor driven motion picture apparatus whereby the speed of the governor is automatically controlled from the spring motor in direct proportion to the tension in said motor.

In a motion picture camera, the speed limits between which the mechanism can operate to properly expose a film strip are very well defined. When such an apparatus is driven by means of a spring motor, it will be obvious to those skilled in the art that the spring motor will tend to drive the mechanism at a maximum speed when said motor is wound up tight, and the speed of the mechanism will decrease as the motor runs down. It has been ordinary practice to use a centrifugal governor in such a spring motor driven apparatus of this type in order to control the speed, an adjustable brake shoe being provided to engage the governor disc at the maximum speed allowed in order to cut the speed thereof. But, since in a spring motor driven apparatus the greatest tendency to overrun is presented when the spring is tightly wound, and the pressure between the governor disc and the above-mentioned brake shoe is at a maximum at this point, gradually decreasing as the motor tension is relieved, a controlling means which would tend to increase the braking action on the governor disc in proportion to the tension in the motor has been found desirable.

Therefore, one object of my invention is to provide a controlling means operated from the spring motor which is adapted to increase the pressure between the governor disc and the brake shoe in direct proportion to the tension in the spring motor.

Another object is to provide a controlling means of the type referred to which can move the brake shoe itself relative to the governor disc to effect a braking action thereon in proportion to the tension in the spring motor.

And still another object is to provide a speed controlling means between a spring motor and a centrifugal governor which is automatic in operation, and which is automatically set to operate at any motor tension simply by winding up the motor.

And yet another object is to provide such a controlling means which is simple, efficient, and so compact that it can be incorporated on the most compact form of motion picture apparatus without necessitating an increase in the dimensions of said apparatus.

Briefly, my invention consists in mounting a centrifugal governor in a spring motor driven mechanism so that the governor shaft can float in two bushings. According to Newton's second law, as the weights of the governor fly outward causing a force to move the governor disc toward a given brake shoe, an equal and opposite force will tend to force the floating governor shaft in a direction opposite to that of the governor disc and through one of its mounting bushings. A controlling bar, one end of which is screw threaded on to a screw co-axial with and rotating with the spring motor, is fulcrumed so that the other end will contact the end of the governor shaft which tends to move through one of its bushings. By preventing the governor shaft from moving through the bushing in this manner, the force tending to shift the governor disc toward the brake shoe is increased and decreased depending upon the tension in the spring motor, and the speed of the governor is rigidly controlled.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which, Fig. 1 is a side elevation of a moving picture camera, with one wall thereof removed to show a preferred embodiment of my invention, Fig. 2 is an enlarged section taken on line 2—2 of Figure 1, all parts alien to my invention being omitted for the sake of clearness, Fig. 3 is a section taken through a spring operated camera, showing only the spring motor, the governor, and a control means therebetween which is a modified form of my invention, and Fig. 4 like Figure 3, shows another embodiment of my invention.

Like reference characters refer to corresponding parts throughout the drawings.

Figure 2:
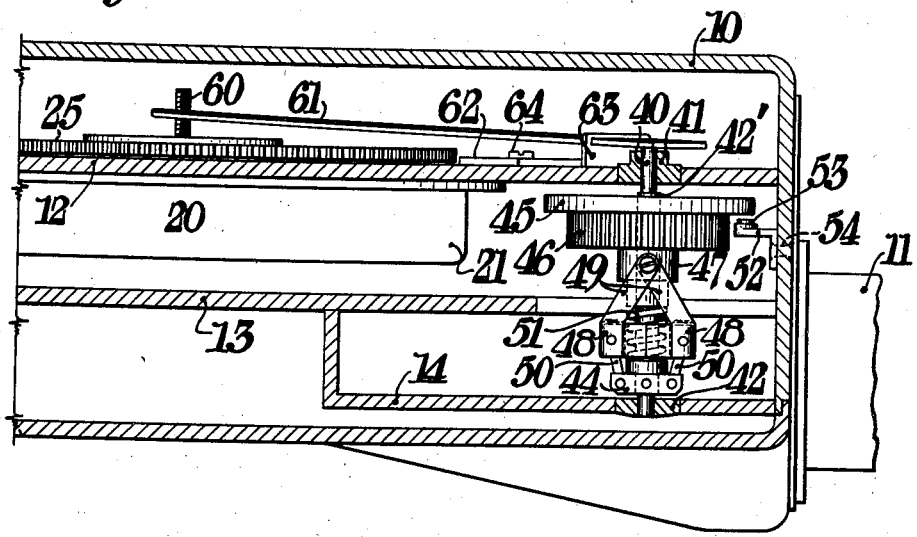

Referring now particularly to Fig. 1 wherein a motion picture camera is shown provided with a preferred embodiment of my invention, the reference character 10 indicates a camera casing on the front of which is mounted an objective 11. The camera casing 10 is divided into compartments by means of partitions 12 and 13, see Fig. 2, said partitions providing mounting plates for the various mechanisms necessary for driving the film feeding mechanism as well as providing a film loading compartment as will be disclosed hereinafter. The camera shown is one of a magazine type which is adapted to be loaded with film by merely inserting a film magazine M, see Fig. 1, into place therein, the film being fed past an exposure aperture in the end of the magazine by means of a film claw 15 which is driven in the customary manner by means of an eccentric 16.

The film claw 15 as well as the take-up reel in the magazine, not shown, is driven by a pair of spring motors 20 and 20' operating in tandem. Each spring motor, see 20 of Fig. 1 and Fig. 2, consists of a casing 21 which is mounted on the partition 12, and which is adapted to enclose a spiral spring 22, one end of such spring being fixed to the wall of the casing by riveting as shown at 23 or by any suitable means; while the other end of said spring is fixed to a hub or a motor shaft, not shown, extending through the center of the casing. Rotatable with the motor shafts of the spring motors are gear 25 and gear 26, said gears lying on the opposite side of the partition 12 with respect to the motor with which they are connected. Gears 25 and 26 are connected together by pinion 27, said pinion in turn being in mesh with another gear 28 which is fixed to the winding shaft 29 to which a handle, not shown, is connected for winding the motor. As shown in Figure 1, eccentric 16 on which the film claw 15 is mounted, is driven by the spring motor in a well known manner through the gear train including gears 25, 26, 27, 30, 31, 32, 33, and 34, which transmit power from one to the other in the order named, said gears being of suitable ratios to give the proper speed transmission required.

Partitions 12 and 14 are provided with bushings 41 and 42 respectively, and a governor shaft 40 is mounted in said bushings to rotate and also float axially therein. The floating or axial movement of the shaft is limited in the direction of bushing 41 by a shoulder 42' formed on the governor shaft, and is limited as to movement toward bushing 42 by means of collar 44 which is pinned to the shaft to rotate therewith. A governor disc 45 and a gear 46 fixed thereto are rotatably mounted on the governor shaft 40, but are mounted so as to be slidable axially on said shaft. The gear member 46 is adapted to engage gear 33 in the gear train between the spring motor and the film feeding mechanism, see Fig. 1, so that the governor is interposed in said gear train to cause a retarding of the train when needed as will be described hereinafter.

A second collar 47 is fixed to the gear member 46 to rotate and move axially of the governor shaft 40 along with the gear member and the governor disc. A plurality of weight members 48 are pivotally linked between collar 47 and collar 44 by means of a plurality of link arms 49 and 50. The collars 47 and 44 are normally spring pressed apart by means of a coil spring 51 which encircles the governor shaft 40. Any brake means of known form and function can be provided for the purpose of determining the governor speed, but for the purpose of simple illustration I have shown a braking means comprising a brake arm 52 which is fixedly mounted on the camera casing 10 by means of bolt 54. A brake shoe 53 composed of any suitable friction material is fastened to one end of the brake arm 52 to engage one surface of the governor disc 45.

A threaded stub shaft 60 is mounted on the spring motor 20 so that it extends axially from the shaft of said motor, and is rotatable with the shaft and gear 25 thereof. A bar member 61 is provided with a threaded aperture through which the stub shaft 60 is adapted to extend and maintain said bar member 61 and the shaft 60 in constant threaded engagement. The bar member 61 is of sufficient length so that its free end is adapted to contact the floating governor shaft 40 as will be hereinafter described. A fulcrum member 62 is provided with a slotted up-turn portion 63 through which the bar member 61 extends. The fulcrum member 62 is mounted on the partition 12 by means of a pin and slot connection 64; see Fig. 1, the slot in the member being parallel to the bar member 61 so that the fulcrum member can be shifted on the partition 12 to alter the mechanical advantage in the bar member between its point of connection with the spring motor 20 and its end contacting the floating governor shaft 40.

Referring now to Figs. 1 and 2, the operation of the bar member 61 on the governor will be described. By mounting the governor shaft 40 in bushings 41 and 42 so that it can float with respect thereto, it can be understood by those skilled in the art, that as the weights 48 fly outwardly due to centrifugal force and pull the governor disc 45 toward the brake shoe 53; according to Newton's second law, there will be an opposite and equal force tending to force the governor shaft 40 in the opposite direction. Therefore, since the governor shaft 40 is mounted so that it can float axially in the bushings 41 and 42, it will move through the partition under this equal and opposite force. It can be appreciated that if the governor shaft is prohibited from moving under this equal and opposite force, that said force will be added to the one tending to move the governor disc toward the brake shoe, and thereby effect a more efficient braking action on the governor.

In a spring motor driven apparatus which is controlled by a centrifugal governor, the greatest braking action on the governor disc will occur when the motor is tightly wound, and the required braking action on the governor will gradually decrease as the spring motor runs down or unwinds. Therefore, by providing a connection between the floating governor shaft 40 and the spring motor 20 as I have in bar member 61, the braking action on the governor disc will be automatically controlled by the winding and unwinding of the spring motor. Referring particularly to Fig. 2, the threaded engagement between the bar member 61 and the threaded shaft 60 which is axial and rotatable with the motor shaft, is such that as the motor is wound up, the end of the bar member 61 is moved outwardly on the threaded cam 60 or away from the motor casing 20. This movement of the bar member 61 will necessarily cause the opposite end of the bar member to move closer to the bushing 41 and prohibit the floating governor shaft 40 from moving therethrough. By preventing the floating governor shaft from moving through the bushing 41 when the governor is driven by the spring motor, the force tending to move the governor disc 45 toward the brake shoe 53 is increased, as described above, and a maximum braking action on the governor is applied when needed. As the motor runs down, the bar member 61 will move in on the threaded shaft 60 and its other end will gradually be removed from the floating governor shaft 40, allowing the shaft to move axially of the bushing and thereby relieve the braking action between the governor disc 45 and the brake shoe 53 as the tension in the spring motor is relieved. It will be readily understood that my novel controlling means between the spring motor and the centrifugal governor alters the braking action on the governor disc in direct proportion to the tension in the spring motor, and gives a more rigid speed control to such a spring motor driven mechanism. The mechanical advantage of the bar member 61 can be easily altered for any given mechanism by simply adjusting the fulcrum member 62 and the partition 12.

Inasmuch as the embodiment of my invention shown in Figs. 1 and 2 would require a comparatively fine cut thread on the threaded shaft 60 in order that its length would not be excessive to allow for sufficient movement of the bar member 61 thereon as the spring motor is wound or unwound, and also since the position of the threaded shaft necessitates an additional widening of the camera; I have shown a modified embodiment of my structure in Fig. 3 whereby the threaded shaft driven by the motor shaft may be of any desirable pitch and the width of the camera can be substantially decreased.

Referring now to Fig. 3, a camera is shown including the casing 10 and partitions 12, 13, and 14, substantially the same as was referred to in Figs. 1 and 2 with the exception that the partition 12 is located closer to the camera casing than was possible in the structure shown in Figs. 1 and 2 for reasons which will be apparent from the following description. A pair of spring motors 20 and 20' are mounted on one side of the partition 12, and the motor gears 25 and 26 therefor are mounted on the opposite side of the partition 12 and are geared together by pinion 27 as described in connection with Figs. 1 and 2. A threaded shaft 75 is journaled in the casing of the motor 20' and in the partition 13, and a gear 76 fixed thereto is in engagement with a small pinion 77 fixed to the end of the motor shaft of spring motor 20'. The ratio between the pinion 77 and gear 76 is such that the rotation of the threaded shaft 75 is greatly reduced relative to the speed of rotation of the motor shaft so that a coarse thread can be used on the threaded shaft 75 for the purpose hereinafter described.

A centrifugal governor identical with the one described in Figs. 1 and 2 is mounted between the partitions 12 and 14 so that the governor shaft 40 thereof is adapted to float in its mounting and be interposed in the gear train between the spring motor and the film feeding mechanism as described in connection with Fig. 1. A lever 80 has one end provided with a threaded aperture which is maintained in threaded engagement with the shaft 75. The lever 80 is provided with an offset portion 81, which portion extends through an aperture 82 in the partition 12 so that the end of said lever which contacts the end of the floating governor shaft 40 will be on the opposite side of the partition 12 with respect to the end of the lever 80 in threaded engagement with the shaft 75. The lever 80 is fulcrumed by means of a fulcrum member 62 identical as to form and as to mounting with the fulcrum member described in connection with Figs. 1 and 2. As the spring motors 20' and 20 are wound up, the threaded engagement between the lever arm and the shaft 75 is such that the end of the lever 80 moves toward the spring motor 20', thereby causing the other end of the lever to move toward the partition 12 and prevent the floating governor shaft 40 from moving through said partition due to the force rendered on the shaft, such force being equal and opposite to the force tending to move the governor disc toward the brake shoe. As the motor unwinds and the tension is released therein, one end of the lever 80 moves away from the motor 20' thus causing the other end of the lever to move away from the partition 12 and allow the floating governor shaft 40 to move through the partition and reduce the braking force between the governor disc 45 and the brake shoe 53. It can be readily understood that the restraining force produced on the floating governor shaft by the end of the lever 80 corresponding to any particular tension on the spring motor will depend upon the ratio of the gearing between the pinion 77 on the motor shaft and the gear 76 on the threaded shaft 75 along with the mechanical advantage in the lever determined by the position of the fulcrum member 62. By altering either or both the gear ratio specified or the position of the fulcrum member 62, the force tending to move the governor disc toward the brake shoe 53 will be varied accordingly.

In Fig. 4 I have shown a modification of the structure shown in Fig. 3 wherein the threaded shaft 75 is replaced by a cam arrangement, and the controlling lever actuates the brake shoe instead of restraining the floating governor shaft 40. In this embodiment of my invention the threaded shaft 75, see Fig. 3, is replaced by a plain shaft 90 the ends of which are rotatably mounted in partition 13 and the casing of 20'. The shaft 90 is driven from the spring motor through the engagement of gears 76 fixed thereto and the pinion 77 fixed to the motor shaft. On the end of the shaft 90 is fixedly mounted a cam member 91 having a cam face that is computed from a curve based on the characteristics which are peculiar to the speed changes found in a spring motor when unwinding from a maximum tension to a minimum tension. The particular theory with respect to the variations in speed found in the unwinding of a spring motor need not be gone into in this specification, but it will suffice to say that such speed changes do not vary according to a straight line.

In Fig. 4, the centrifugal governor is substantially the same as those shown and described in Figs. 1, 2, and 3 with the exception that the governor shaft 40 may be fixed against floating, or may be allowed to float as previously described. The brake shoe 53 is mounted on a spring arm 93 which is fixed to the camera casing 10, said spring arm constantly forcing the brake shoe toward the governor disc 45, and being strong enough to prevent the disc when moving toward the shoe 53 under the centrifugal force of the governor weights 48, from moving said arm downwardly. Lever 95 has a roller 96 pinned to one end thereof to ride on the face of the cam 91, said roller being normally held in contact with the cam face through the action of the spring 97 which connects the lever 95 to the partition 13. Lever 95 is offset as at 98 to extend through an aperture 82 in the partition 12 and through the mounted fulcrum member 62 which is mounted on the opposite side of the partition 12 with respect to the cam member 91. The end 94 of lever 95 is bent at right angles to extend through another aperture 99 in the partition 12 so that it can contact the spring brake arm 93 and act thereon as hereinafter described.

As shown in Fig. 4, the spring motors 20' and 20 are wound up tight and are under maximum tension. Under these conditions it is necessary that the braking action of the shoe on the governor disc be at a maximum, so cam member 91 is in such a position that the roller 96 on the lever 95 contacts the cam face at its lowest portion. In this position the lever 95 is fulcrumed about the fulcrum member 62 so that its end contacting the brake arm 93 is removed from the brake arm thereby allowing the arm to move the brake shoe 53 toward the stationary position of the governor disc 45 to effect the maximum braking action on the governor. As the motors run down, the braking action required between the brake shoe 53 and the governor disc 45 decreases, and this is taken care of by the rotation of the cam member 91 whose face causes the end of the lever member bearing the roller to be raised thus causing the opposite end of the lever to force the brake shoe 53 away from the governor disc 45. The ratio of the gearing between the pinion 77 and the gear 76 is such that the cam member 91 makes only one-half revolution during the time the spring motors are running from a completely wound up position to a completely unwound position. Therefore, as the spring motors run down, the cam member 91 causes the lever 95 to gradually move the spring brake arm 93 and the brake shoe thereon away from the governor disc, and thereby control the speed of the governor in direct proportion to the tension in the spring motors. It will be readily understood that as the motors are wound up, the cam member 91 will automatically be returned to the position shown in Fig. 4 wherein the lever 95 will be removed from contact with the brake arm 93 and a maximum braking action will again be set up in the governor.

From the above specification, it can be readily understood that my novel control for spring motors presents a control by means of which the speed of the mechanism can be controlled from the spring motors themselves so that the braking action on the mechanism is applied in direct proportion to the tension in the motor. My novel speed control provides a means whereby the speed of spring motor operated mechanisms can be more rigidly controlled than has been possible with previously used structures, and it is so compact and simple that it can be incorporated in any mechanism which is operated by spring motors without requiring a sacrifice of the compactness of the original mechanism.

Although I have shown and described certain specific embodiments of my invention, I am fully aware that many modifications thereof are possible. My invention, therefore, is not to be restricted except insofar as is necessitated by the prior art and by the spirit of the appended claims.

Having thus described my invention, what I declare as new and desire to secure by Letters Patent is:

1. In a motor driven apparatus, the combination with a driven member, a spring motor connected thereto for driving the same, a centrifugal governor driven by said spring motor and including a governor shaft, and a friction surface which moves to various positions corresponding to the speed of the governor, supports for said governor shaft and permitting axial movement thereof, and a brake member adapted to frictionally engage said surface, said governor shaft, surface, and brake member being so arranged that upon operation of the governor the shaft has a tendency to move axially in said support, of a control means operated by said spring motor for permitting variation of the frictional engagement between said surface and the brake member in direct proportion to the tension in the spring motor, said control means including a bar member operated by the spring motor and adapted to restrain the governor shaft in its axial movement under operating conditions of the governor.

2. In a motor driven apparatus, the combination with a driven member, a spring motor connected thereto for driving the same, a centrifugal governor driven by said spring motor and including a governor shaft and a friction surface which moves to various positions corresponding to the speed of the governor, supports for said governor shaft and permitting axial movement thereof, and a brake member adapted to frictionally engage said surface, of a control means operated by said spring motor and including an operating member for controlling the position of said governor shaft to permit variation of the frictional engagement between said surface and the brake member in direct proportion to the tension of said spring motor, said governor shaft, surface, and brake member being so arranged that upon operation of the governor the shaft has a tendency to move toward said operating member of the control means.

3. In a motor driven apparatus, the combination with a driven member, a spring motor connected thereto and for driving the same, a speed-responsive means driven by said spring motor and including a surface movable to various positions corresponding to the speed of said means, a brake member adapted to frictionally engage said surface, of a lever system between the spring motor and said speed-responsive means, one end of said lever system engaging said speed-responsive means to vary the braking action thereof, a member having an inclined surface connected to said spring motor to be moved thereby, the other end of the lever system engaging and being moved by said member to vary the braking action on the speed responsive means in direct proportion to the spring tension of said motor.

4. In a motor driven apparatus the combination with a driven member, a spring motor connected thereto and for driving the same, a speed-responsive means driven by said spring motor and including a surface movable to various positions corresponding to the speed of said means, a brake member adapted to frictionally engage said surface, a threaded shaft rotatably responsive to the unwinding and winding of said spring motor, of a lever, one end of said lever in threaded engagement with said threaded shaft, the other end of said lever adapted to engage said speed-responsive means whereby the braking action on said means is varied in direct proportion to the tension in the spring motor.

5. In a motor driven apparatus, the combination with a driven member, a spring motor connected thereto and for driving the same, a motor shaft, a speed-responsive means driven by said spring motor and including a surface movable to various positions corresponding to the speed of said means, a brake member adapted to frictionally engage said surface, a threaded member concentric and rotatable with said motor shaft, of a lever, one end of said lever in threaded engagement with the threaded member, an adjustable fulcrum member for said lever, the other end of said lever adapted to engage the speed-responsive means and vary the braking action thereof in direct proportion to the tension of the spring motor.

6. In a spring motor driven apparatus, the combination with a driven member, a spring motor connected thereto for driving the same, a centrifugal governor driven by said spring motor and provided with a friction surface which moves to various positions corresponding to the speed of the governor, an adjustable brake member adapted to frictionally engage said surface, of a controlling means between the motor and said adjustable brake member for varying the frictional engagement between said brake member and said friction surface, said controlling means including a cam connected to the spring motor to be moved thereby, and having a working surface corresponding to the tension in said spring motor, whereby the frictional engagement between the brake member and said movable friction surface is varied in proportion to the tension in the spring motor.

7. In a spring motor driven apparatus, the combination with a driven member, a spring motor connected thereto for driving the same, a centrifugal governor driven by said spring motor and provided with a friction surface which moves to various positions corresponding to the speed of the governor, an adjustable brake member adapted to frictionally engage said surface, said brake member normally spring pressed into frictional engagement with said surface, of an operating means actuated by said spring motor arranged and adapted to be moved to positions corresponding to the tension in said motor and for moving the brake member away from said surface as the tension in the motor decreases.

8. In a motor driven apparatus, the combination with a driven member, a spring motor connected thereto for driving the same, a motor shaft, a centrifugal governor driven by said spring motor and including a friction surface which moves to various positions corresponding to the speed of the governor, an adjustable brake member adapted to frictionally engage said surface, of a controlling means between the motor and said brake member for varying the frictional engagement between said brake member and said friction surface in proportion to the tension in the spring motor, and including a member having an inclined working surface corresponding to the tension in the spring motor, a lever, one end of said lever in engagement with the inclined surface of said member, a fulcrum for said lever, the other end of said lever connected to the brake member for adjusting the same relative to the friction surface as the tension in the motor varies.

9. In a motor driven apparatus, the combination with a driven member, a spring motor connected thereto for driving the same, a motor shaft, a centrifugal governor driven by said spring motor and including a friction surface which moves to various positions corresponding to the speed of the governor, an adjustable brake member adapted to frictionally engage said surface and normally spring pressed into engagement therewith, of a control means operated by said spring motor for effecting a variation of the frictional engagement between said friction surface and said brake member in direct proportion to the tension in the spring motor, and including a cam member rotatably responsive to a winding and unwinding of said motor, and having a working surface corresponding to the tension in the spring motor, a fulcrumed lever, one end of said lever normally engaging the working surface of said cam, the other end of said lever adapted to engage the brake member to force the same away from the friction surface as the motor unwinds.

10. In a motor driven apparatus, the combination with a driven member, a spring motor connected thereto for driving the same, a centrifugal governor driven by said spring motor and including a governor shaft and a friction surface which moves to various positions corresponding to the speed of the governor, a support for said governor shaft and permitting axial movement thereof, and a brake member adapted to frictionally engage said surface, said governor shaft, surface, and brake member being so arranged that upon operation of the governor the shaft has a tendency to move axially in said support, of a control means operated by said spring motor for permitting variation of the frictional engagement between said surface and the brake member in direct proportion to the tension in the spring motor, said control means including a lever system, one end of said lever system adapted to restrain the governor shaft in its axial movement under operating conditions of the governor, and suitable means driven by said spring motor and operating on the other end of said lever system to vary the restraining action of said lever system on the governor shaft in direct proportion to the tension in the spring motor.

11. In a motor driven apparatus, the combination with a driven member, a spring motor connected thereto for driving the same, a motor shaft, a centrifugal governor driven by the spring motor, and including a governor shaft and a friction surface which moves to various positions corresponding to the speed of the governor, a support for said governor shaft and permitting axial movement thereof, and a brake member adapted to frictionally engage said surface, said governor shaft, surface, and brake member being so arranged that upon operation of the governor the shaft has a tendency to move axially in said support, of a threaded member concentric and rotatable with the motor shaft, a lever, one end of said lever being in threaded engagement with said threaded member, fulcrum for said lever, the other end of said lever extending into the path of the axial movement of said governor shaft to restrain the movement thereof whereby the braking action on the friction surface is varied in direct proportion to the tension in the spring motor.

12. In a motor driven apparatus, the combination with a driven member, a spring motor connected thereto for driving the same, a centrifugal governor driven by the spring motor and including a governor shaft and a friction surface which moves to various positions corresponding to the speed of the governor, a support for said governor shaft and permitting axial movement thereof, and a brake member adapted to frictionally engage said surface, said governor shaft, surface, and brake member being so arranged that upon operation of the governor the shaft has a tendency to move axially in said support, of a threaded member adapted to be rotated by the winding and unwinding of said spring motor, a lever, one end of said lever being a threaded engagement with said threaded member, a fulcrum for said lever, the other end of said lever extending into the path of movement of said governor shaft to restrain the movement thereof whereby the braking action on the friction surface is varied in direct proportion to the tension in the spring motor.

13. In a motor driven apparatus, the combination with a driven member, a spring motor connected thereto for driving the same, a motor shaft, a centrifugal governor driven by the spring motor, and including a governor shaft and a friction surface which moves to various positions corresponding to the speed of the governor, a support for said governor shaft and permitting axial movement thereof, and a brake member adapted to frictionally engage said surface, said governor shaft, surface, and brake member being so arranged that upon operation of the governor the shaft has a tendency to move axially in said support, of a threaded member driven from said motor shaft thru a reduction gearing, a lever, one end of said lever being in threaded engagement with said threaded member, a fulcrum for said lever, the other end of said lever extending into the path of movement of said governor shaft to restrain movement thereof, whereby the braking action on the friction surface is varied in direct proportion to the tension in the spring motor.

14. In a motor driven apparatus, the combination with a driven member, a spring motor connected thereto for driving the same, a centrifugal governor driven by the spring motor, and including a governor shaft and a friction surface which moves to various positions corresponding to the speed of the governor, a support for said governor shaft and permitting axial movement thereof, and a brake member adapted to frictionally engage said surface, said governor shaft, surface, and brake member being so arranged that upon operation of the governor the shaft has a tendency to move axially in said support, of a cam member adapted to be driven by the winding and unwinding of said motor, a lever, one end of said lever being maintained in contact with said cam member, an adjustable fulcrum for said lever, the other end of said lever being adapted to vary the friction between the surface and said brake member in direct proportion to the tension in the spring motor.

15. In a motor driven apparatus, the combination with a driven member, a spring motor connected thereto for driving the same, a centrifugal governor driven by said spring motor and including a friction surface which moves to various positions corresponding to the speed of the governor, an adjustable brake member adapted to frictionally engage said surface, of a cam member adapted to be driven by the winding and unwinding of said spring motor, a lever, one end of said lever being maintained in contact with the cam member, an adjustable fulcrum for said lever, the other end of said lever being adapted to adjust the adjustable braking member relative to said surface whereby the frictional engagement between the two is varied in direct proportion to the tension in the spring motor.

16. In a motor driven apparatus, the combination with a driven member, a spring motor connected thereto for driving the same, a motor shaft, a centrifugal governor driven by said spring motor and including a friction surface which moves to various positions corresponding to the speed of the governor, a brake member normally spring pressed toward said friction surface and adapted to frictionally engage the same, of a cam member connected to the motor shaft to rotate therewith, a lever, a roller mounted on one end of said lever to ride on the cam member, a fulcrum for the lever, the other end of said lever being adapted to engage the brake member for forcing said member away from the friction surface as the motor unwinds, whereby the braking action on the governor is varied in direct proportion to the tension in the spring motor.

17. In a motor driven apparatus, the combination with a driven member, a spring motor connected thereto for driving the same, a speed responsive means driven by said spring motor and including a surface movable to various positions corresponding to the speed of said means, and a brake member adapted to frictionally engage said surface, of a controlling means between the motor and one element of said speed responsive means for varying the frictional engagement between the brake member and said movable surface, and including a member connected to the spring motor to be moved thereby, said member having an inclined working surface corresponding to the tension in the spring motor whereby the frictional engagement between the brake member and said movable surface is varied in proportion to the tension in the spring motor.

18. In a motor driven apparatus the combination with a driven member, a spring motor connected thereto for driving the same, a speed responsive means driven by said spring motor and including a member adjustable to vary the controlling power of the speed responsive means, of a controlling means between the motor and said adjustable member for actuating said adjustable member to vary the braking power of said speed responsive means in proportion to the tension in the spring motor, said controlling means including a lever system, one end of which engages the adjustable member, and a member having an inclined surface connected to said spring motor to be moved thereby and engaging the other end of the lever system to adjust the same as the motor is wound or unwound.

19. In a motor driven apparatus, the combination with a driven member, a spring motor connected thereto for driving the same, a centrifugal governor assembly including a shaft member, a friction disc movable to various positions corresponding to the speed of the governor, and a brake member adapted to frictionally engage said friction disc, of a control means operated by said spring motor for permitting variation of the frictional engagement between the surface and the brake member in direct proportion to the tension in the spring motor, said control means including a member connected to the motor to be moved thereby and having an inclined working surface, and a lever arranged so that one end thereof engages one of the elements of the governor assembly while the other end thereof engages and is moved by the inclined surface of said member.

GUNNAR GUNNARSON.